United States Patent
Perdue

(10) Patent No.: US 7,901,012 B1
(45) Date of Patent: Mar. 8, 2011

(54) WHEEL WHICH PRODUCES AN ECCENTRIC VISUAL EFFECT

(76) Inventor: Jesse Thomas Perdue, Erin, TN (US)

(*) Notice: Subject to any disclaimer, the term of this patent is extended or adjusted under 35 U.S.C. 154(b) by 103 days.

(21) Appl. No.: 12/459,077

(22) Filed: Jun. 29, 2009

(51) Int. Cl.
*B60B 19/00* (2006.01)
(52) U.S. Cl. ............ 301/5.1; 301/95.109; D12/208
(58) Field of Classification Search ............ 301/5.1, 301/5.301, 5.309, 63.101, 63.106, 64.203, 301/64.707, 95.109; D12/204, 208, 212; 295/1, 6, 21
See application file for complete search history.

(56) References Cited

U.S. PATENT DOCUMENTS

| 1,593,238 | A | * | 7/1926 | Basler | ............ 16/45 |
| 5,647,642 | A | * | 7/1997 | Word | ............ 301/5.21 |
| 6,663,190 | B2 | * | 12/2003 | Kashiwai et al. | ....... 301/63.101 |

* cited by examiner

*Primary Examiner* — Jason R Bellinger
(74) *Attorney, Agent, or Firm* — Norman B. Rainer

(57) ABSTRACT

A wheel having a hub centered upon an axis of rotation is provided with a disc member extending outwardly from the hub and centered upon a plane that intersects the axis at an angle between 47 and 87 degrees and terminates in a rim member having a radially measured thickness which progressively varies between diametrically opposed thick and thin regions which are in reversed relationship on opposed surfaces of the wheel.

5 Claims, 3 Drawing Sheets

WHEEL WHICH PRODUCES AN ECCENTRIC VISUAL EFFECT

BACKGROUND OF THE INVENTION

1. Field of the Invention

The present invention relates to wheels for vehicles intended for outdoor use upon roadways and pathways, and more particularly concerns wheels which support resilient tires as employed by motorized vehicles.

2. Description of the Prior Art

It is well known that wheels can impart desirable aesthetic effects to the vehicle with which they are associated. In the case of automobiles and trucks, decorative hub caps are often removably emplaced upon the center portion of the wheel that includes an axle which secures the wheel. In other instances, the entire central portion of the wheel structure, extending from the centered axle to the outer perimeter or tire-mounting rim may be of a specialized design having high aesthetic appeal.

In many instances, the wheel design is intended to be attractive particularly when the vehicle is motionless. However, wheel designs are also employed wherein a special visual effect is produced during motion of the vehicle. Such movement effects usually employ a hub cap that rotates by inertial action. However, wheels which contain interactive moving components may have durability limitations and may present safety concerns.

It is accordingly an object of the present invention to provide a wheel which will provide an unusual visual effect.

It is a further object of this invention to provide a wheel as in the foregoing object which secures a resilient tire.

It is a still further object of the present invention to provide a wheel of the aforesaid nature intended for use on vehicles such as automobiles.

These objects and other objects and advantages of the invention will be apparent from the following description.

SUMMARY OF THE INVENTION

The above and other beneficial objects and advantages are accomplished in accordance with the present invention by a wheel comprised of:

a) a hub having a centered axis of rotation, and provided with means for releasible attachment to a driving axle,
b) a disc member extending outwardly from said hub to a substantially circular outer boundary and centered upon a plane which intersects said axis at an angle between 47 and 87 degrees, and
c) a rim member bounded by a circular outer perimeter centered upon said axis and having a uniform width defined by opposed face surfaces in orthogonal relationship to said axis, and a recessed inner wall of generally circular configuration which joins with the outer boundary of said disc member, causing the radially measured thickness of said rim to progressively vary between diametrically opposed thick and thin regions which are in reversed relationship on said opposed face surfaces.

The outer perimeter of said rim member may be provided with means for the mounting of an inflated tire. A preferred mounting means employs a circuitous trough bounded by opposing flanges.

BRIEF DESCRIPTION OF THE DRAWINGS

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
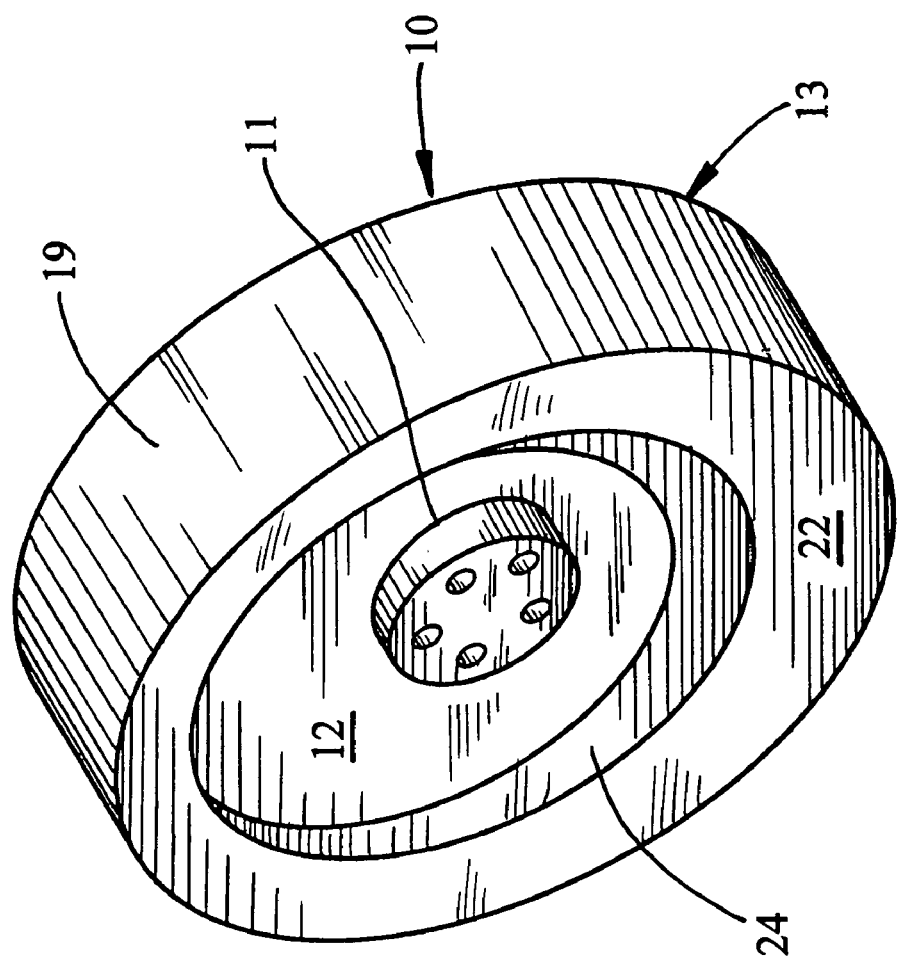
FIG. 1 is a perspective side view of an embodiment of the wheel of the present invention, shown without associated tire-mounting means.
Figure 3:
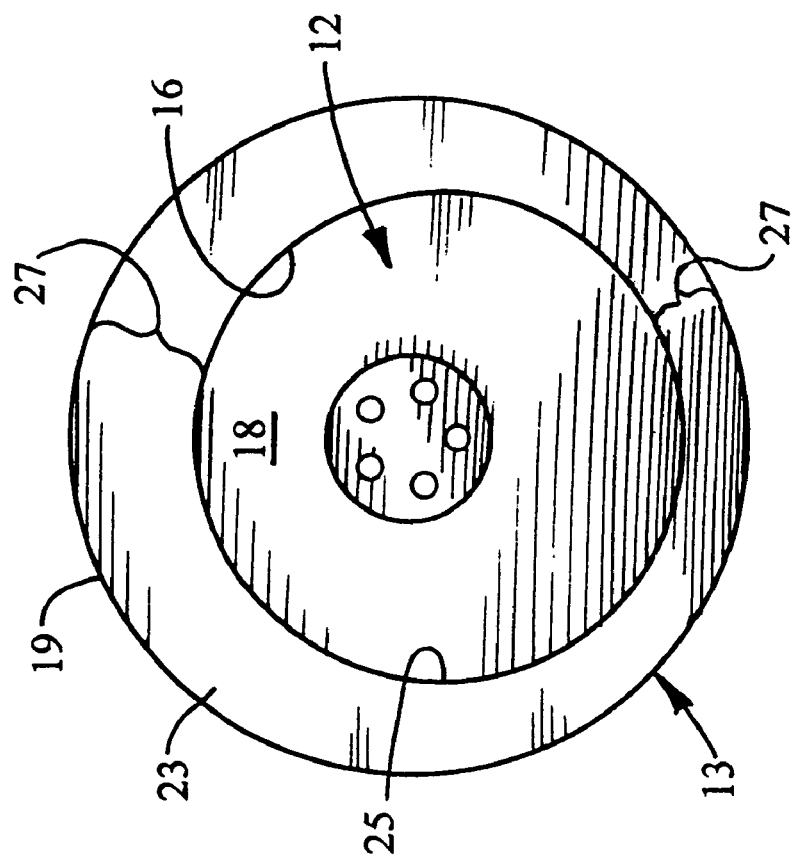
FIG. 3 is a side view opposite to that of FIG. 2.
Figure 2:
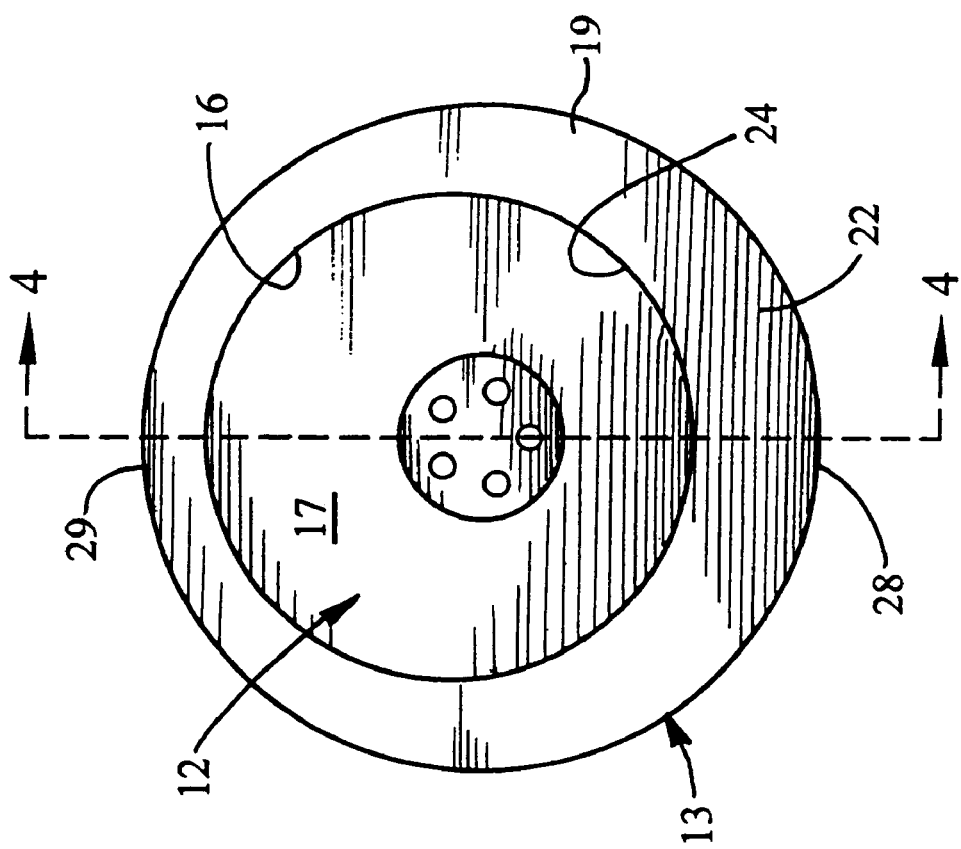
FIG. 2 is a side view thereof.
Figure 4:
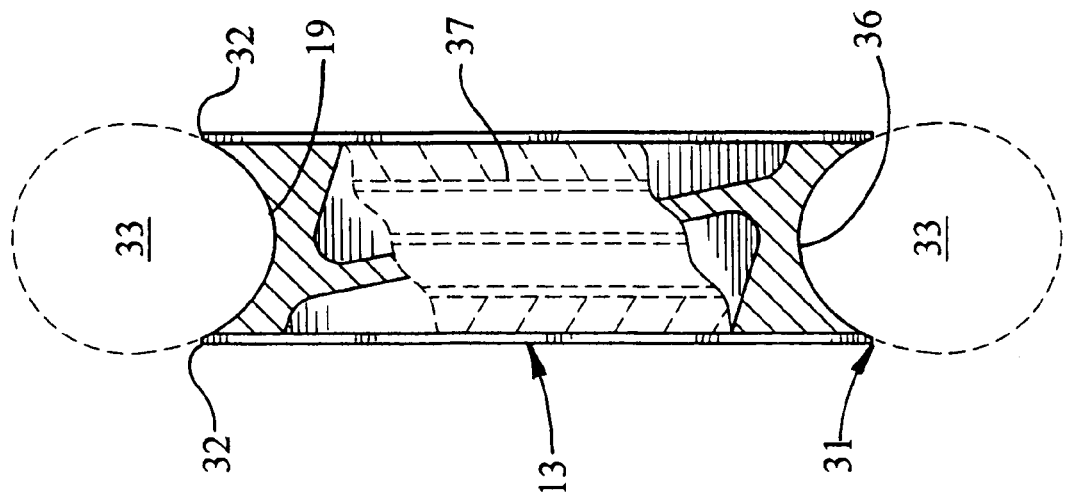
FIG. 4 is a sectional view taken in the direction of the arrows upon line 4-4 of FIG. 2.

Referring now to FIGS. 1-4, an embodiment of the wheel 10 of the present invention is shown comprised of hub 11, disc member 12 and rim member 13. For convenience of illustration said several components of the wheel are shown as a single monolithic shape which can be produced by a molding operation. Alternatively, the components, all fabricated of metal, can be interconnected by welding or other conventional metal-working techniques.

Hub 11 has means for securing the wheel onto an axle which provides rotary driving force. Such axle, not a part of this invention, may be associated with a motor vehicle such as an automobile or truck. Suitable securing means may be in the form of a plurality of bolt-accommodating bores 14 symmetrically spaced about center axis 15. Said bolts align with bolt-receiving holes in a flange secured to such axle. Other axle-securing means may, however by employed.

Disc member 12 extends outwardly from attachment with hub 11, terminating in a substantially circular outer boundary 16. Said disc member is centered upon plane 30 that intersects axis 15 at an acute angle A of between 47 and 87 degrees. The smaller angles within such range apply to golf cart type wheels which are of small diameter and have a relatively wide rim or tread. Said disc member is further bounded by interior and exterior surfaces 17 and 18, respectively, which may be flat or contoured.

Rim member 13 is bounded by circular outer perimeter 19 centered upon axis 15 and having a uniform width 20 defined by opposed inside and outside faces 22 and 23, respectively, disposed in orthogonal relationship to axis 15. Said rim member is further bounded by a recessed inner wall comprised of interior and exterior arcuate surfaces, 24 and 25, respectively, of generally circular configuration which join with outer boundary 16 of disc member 12. Such manner of construction causes the radially measured thickness 27 of said rim member to progressively vary between diametrically opposed thickest and thinnest regions 28 and 29, respectively, which are in reversed relationship on said opposed face surfaces.

Although the wheel, when viewed in horizontal side profile, has a lopsided appearance, it is perfectly balanced with respect to centrifugal effect about axis 15. During travel, the rotating wheel presents an extremely unusual eccentric or wobble effect which simulates the appearance of a wheel about to dislodge from its supporting axle. The unusual visual effect can be further enhanced by complimentary indicia placed upon exterior surface 18 of the disc member.

Figure 5:
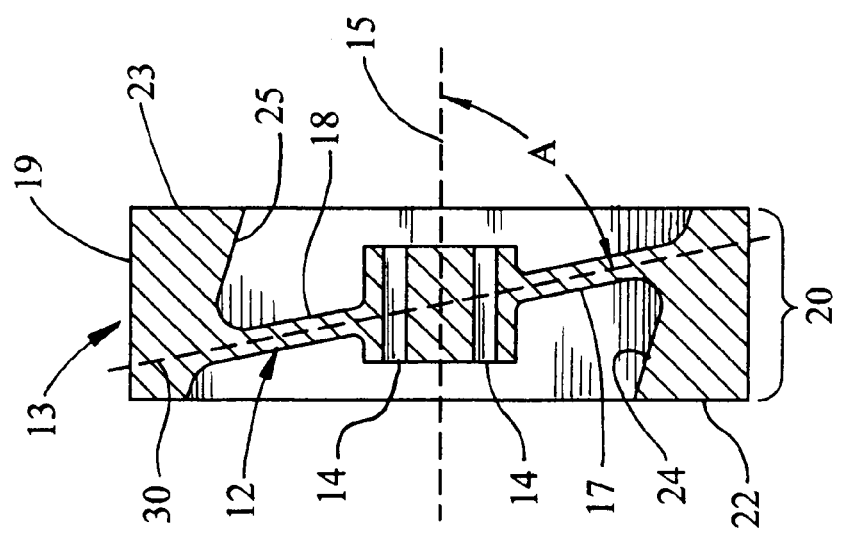
FIG. 5 is an end view of an alternative embodiment which includes tire-mounting means, with portions broken away to reveal interior details.

FIG. 5 shows an embodiment of the wheel of this invention having tire mounting means 31 associated with perimeter 19 of rim member 13. In particular, said tire mounting means is comprised of an annular trough 36 bounded by opposed flanges 32. Said tire mounting means may be adapted to accommodate either a tubeless or tube-equipped tire 33 whose outermost tread 37 surrounds the wheel.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:
1. A wheel comprised of:
   a) a hub having a centered axis of rotation, and provided with means for releasable attachment to a driving axle,
   b) a disc member extending outwardly from said hub to a substantially circular outer boundary and centered upon a plane which intersects said axis at an angle between 47 and 87 degrees, and
   c) a rim member bounded by a circular outer perimeter centered upon said axis and having a uniform width defined by opposed face surfaces in orthogonal relationship to said axis, and a recessed inner wall of generally circular configuration which joins with the outer boundary of said disc member, causing the radially measured thickness of said rim to progressively vary between diametrically opposed thick and thin regions which are in reversed relationship on said opposed face surfaces.

2. The wheel of claim 1 wherein the outer perimeter of said rim member has means for the mounting of an inflated tire.

3. The wheel of claim 2 wherein said means for the mounting of an inflated tire includes a circuitous trough bounded by opposing flanges.

4. The wheel of claim 1 wherein said means for releasible attachment to a driving axle includes a plurality of bolt-accommodating bores symmetrically spaced about said axis.

5. The wheel of claim 1 having centrifugal balance with respect to rotation about said axis, yet presenting an eccentric wobble visual appearance during said rotation.

* * * * *